March 17, 1936.                D. FITZ-GIBBON                2,034,137

SPREADER TOP FOR TUBULAR CONTAINERS

Filed March 29, 1935

Inventor:
Dermot Fitz-Gibbon
By
Attorney.

Patented Mar. 17, 1936

2,034,137

UNITED STATES PATENT OFFICE 2,034,137

SPREADER-TOP FOR TUBULAR CONTAINERS

Dermot Fitz-Gibbon, Buenos Aires, Argentina

Application March 29, 1935, Serial No. 13,755

2 Claims. (Cl. 91—67.4)

This invention relates to containers and more particularly to tubular containers of the kind used for pastes, creams and the like substances and preparations which may readily be extruded through a comparatively small opening in one end of the container.

There are nowadays available on the market certain shaving preparations intended to obviate the use of a shaving-brush and the necessity for forming a lather. These preparations are adapted to be applied directly to the skin and when spread more or less evenly over the part to be shaved, act as a ready-made lather. Hitherto these preparations have been marketed in tubular containers of the usual type, that is to say, having at one end a cylindrical nozzle screw-threaded on the outside and bored to provide an orifice through which the preparation is extruded. This method of putting up the shaving preparation has the disadvantage that the preparation must, upon extrusion, be applied to the skin and spread thereon by means of the fingers, an operation which is at the same time messy and disagreeable.

The object of the present invention is to provide a spreader-top for such containers, said spreader-top being intended to receive the preparation as it is extruded and to be thereupon used for spreading the preparation over the area to be shaved, the container itself acting as a handle.

The novel spreader-top comprises essentially a slightly domed spreader-surface having one or more extrusion orifices, and may be formed as an accessory adapted to be screwed on to the container nozzle after removal of the usual closure cap, or it may be made integral with the nozzle.

Figure 1:
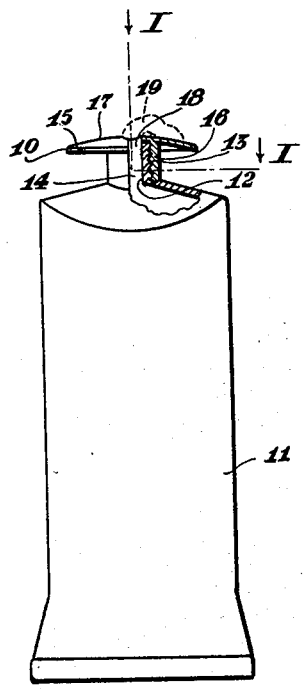
Fig. 1 is a side elevation of a tubular container partly in section and fitted with a spreader-top according to the present invention.
Figure 2:
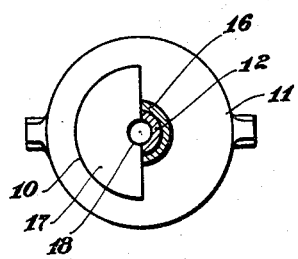
Fig. 2 is a plan view of the container of Fig. 1 and partly in section along the line I—I of Fig. 1.

In accordance with the embodiment shown in Figs. 1 and 2, the spreader-top, indicated generally by the numeral 10, is formed as an accessory to a tubular container 11 of the usual type, having at one end a nozzle 12 screw-threaded on the outside as indicated at 13 to receive the usual closure cap (not shown), and provided with a central extrusion channel 14.

The spreader-top comprises a disc-like head 15, on one face of which there is centrally disposed a depending connection member 16. The other face of the head is domed slightly to form a convex spreader surface 17. The connection member 16 is axially drilled and screw-threaded to receive the nozzle 12 and the head is provided with a central orifice 18 coaxial with the extrusion channel 14 and of the like or greater diameter.

It will readily be seen that upon squeezing the container 11 in the usual way to extrude the therein contained preparation, said preparation will be received by the spreader-surface 17 as indicated in dotted lines at 19. The preparation may then easily and cleanly be spread upon the skin with the aid of the spreader-top by using the container 11 as a handle, thus eliminating the disadvantage hereinbefore alluded to.

Figure 3:
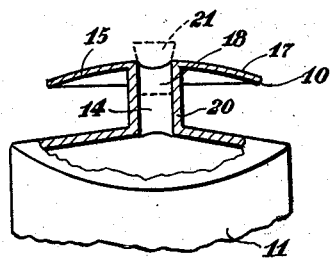
Fig. 3 is a fragmentary view partly in section of the nozzle end of a container having a spreader-top integral with the nozzle.

In the modification illustrated in Fig. 3, the spreader-top 10 is made integral with the container, the connection member and nozzle being then combined to form a neck portion 20. In this embodiment the extrusion orifice 18 may be closed when the container is not in use, by means of a plug indicated in dotted lines at 21, which may be either a push or screw fit.

Figure 4:
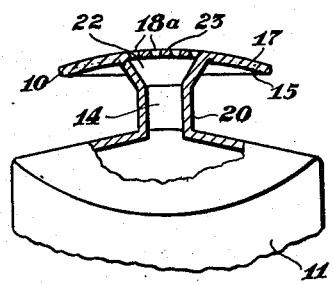
Fig. 4 is a view similar to that of Fig. 3 of a container having an integral spreader-top provided with a plurality of extrusion orifices.
Figure 5:
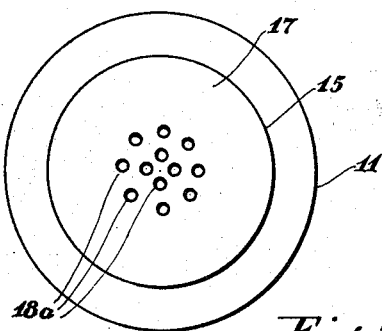
Fig. 5 is a plan view of the structure of Fig. 4.

According to a further modification shown in Figs. 4 and 5, the spreader-top is provided with a plurality of extrusion orifices 18a. In order to allow the several orifices 18a to be arranged over a greater area than would otherwise be the case, the head 15 may be hollowed out from the face adjacent to the neck portion 20 to form a conical input chamber 22 diverging towards the spreader-surface 17, and a thinned down end wall 23 through which the extrusion orifices 18a extend.

Figure 6:
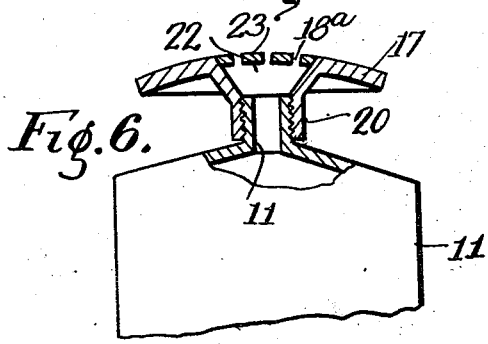
Fig. 6 is a view similar to Fig. 3 showing a modification.

It is to be understood that the accessory form of spreader-top shown in Figs. 1 and 2 may likewise be provided with a plurality of extrusion orifices as shown in Fig. 6.

What I claim is:

1. In a tubular container of the kind described adapted to contain pastes, creams and the like substances and preparations which may be readily extruded, an integral spreader-top for spreading said preparations over the surface to which they are to be applied, said spreader-top comprising a disc-like head having one of its faces domed to form a spreader-surface, a neck portion depending centrally from the face of the head remote from said spreader-surface and forming an integral part of said container, an inlet chamber within said head diverging from said neck portion towards said spreader surface and terminating at said spreader surface in a thinned-down end-wall, a plurality of extrusion orifices in said end-wall and an axial extrusion channel in said neck portion communicating at one end with the interior of the container and at the other end with said inlet chamber.

2. In a tubular container of the kind described adapted to contain pastes, creams and the like substances and preparations which may be readily extruded and having a nozzle, a spreader-top for spreading said preparations over the surface to which they are to be applied, said spreader-top comprising a disc-like head having one of its faces domed to form a spreader-surface, a neck-portion depending centrally from the face of the head remote from said spreader-surface, said neck-portion being axially drilled and internally threaded so as to form a connecting member adapted to be screwed onto the nozzle of the tubular container, an inlet chamber within said head diverging from said neck-portion towards said spreader-surface and terminating at said spreader-surface in a thinned-down end wall, and a plurality of extrusion orifices in said end wall.

DERMOT FITZ-GIBBON.